(12) United States Patent
Heiman et al.

(10) Patent No.: US 9,044,034 B2
(45) Date of Patent: Jun. 2, 2015

(54) BLUE CHEESE PRODUCT AND PROCESS FOR PREPARING SAME

(75) Inventors: Kenneth F. Heiman, Marshfield, WI (US); Thomas S. Torkelson, Viola, WI (US)

(73) Assignee: Nasonville Dairy, Inc., Marshfield, WI (US)

(*) Notice: Subject to any disclaimer, the term of this patent is extended or adjusted under 35 U.S.C. 154(b) by 442 days.

(21) Appl. No.: 12/792,895

(22) Filed: Jun. 3, 2010

(65) Prior Publication Data

US 2011/0300259 A1 Dec. 8, 2011

(51) Int. Cl.
| | |
|---|---|
| A23C 19/068 | (2006.01) |
| A23C 19/084 | (2006.01) |
| A23C 19/028 | (2006.01) |
| A23C 19/04 | (2006.01) |
| A23C 19/05 | (2006.01) |

(52) U.S. Cl.
CPC .......... *A23C 19/0682* (2013.01); *A23C 19/084* (2013.01); *A23C 19/028* (2013.01); *A23C 19/041* (2013.01); *A23C 19/054* (2013.01)

(58) Field of Classification Search
USPC .......................................................... 426/38
See application file for complete search history.

(56) References Cited

U.S. PATENT DOCUMENTS

| | | | |
|---|---|---|---|
| 4,661,357 A | 4/1987 | Daurelles et al. | |
| 4,719,113 A | 1/1988 | Kharrazi | |
| 4,832,964 A * | 5/1989 | Pratt | 426/33 |
| 4,919,944 A | 4/1990 | Bussiere et al. | |
| 5,080,913 A | 1/1992 | Gamay | |
| 5,225,220 A | 7/1993 | Gamay | |
| 5,395,630 A | 3/1995 | Gamay | |
| 5,549,916 A | 8/1996 | Gamay | |
| 7,041,323 B2 | 5/2006 | Andersen | |
| 7,785,644 B1 * | 8/2010 | Vojtech et al. | 426/582 |
| 2002/0136799 A1 | 9/2002 | Nielsen | |
| 2003/0215544 A1 | 11/2003 | Nielsen | |
| 2008/0050467 A1 | 2/2008 | Schlothauer et al. | |

OTHER PUBLICATIONS

Kilcawley et al. "Review Enzyme-Modified Cheese" in Int. Dairy Journal, 8 (1998) 1-10.*
McSweeney, P.L.H.,www.cheesescience.net/2008/11/enzyme-modified-cheese.html.*
Bowland et al., Effects of anions on thermally induced whey protein isolate gels. *Food Hydrocoll* (1995), 9:47-56.
Brown et al., Changes in rheological and sensorial properties of young cheeses as related to maturation. *J. Dairy Sci.* (2003), 86:3054-3067.
Diehl et al., Structural failure in selected raw fruits and vegetables., *J. Texture Stud.* (1979), 10:371-400.
Foegeding et al., Invited Review: Sensory and Mechanical Properties of Cheese Texture. *J. Dairy Sci.* (2007), 90:1611-1624.
Gunasekaran et al., Cheese melt/flow measurement methods—recent development. *Australian Journal of Dairy Technology* (2002), 57(2):128-133.
Hammann, Structural failure in solid foods. *AVI Publishing Company, Inc.* (1983), pp. 351-383.
Kavanagh, G.M. et al., Rheological characterization of polymer gels. *Prog. Polym. Sci.* (1998), 23:533-562.
Nadai, A., Plastic behavior of metals in the strain-hardening range, Part 1. *J. Appl. Physics* (1937) 8:205-213.
Shama F. et al., Evaluation of some textural properties of foods with the Instron universal testing machine. *J. Texture Stud.* (1973), 4:344-353.
Truong, V.D. et al., Textural characterization of cheeses using vane rheometry and torsion analysis *J. Food Sci.* (2001), 66:716-721.

* cited by examiner

*Primary Examiner* — Elizabeth Gwartney
(74) *Attorney, Agent, or Firm* — Charles S. Sara, Esq.; Daniel A. Blasiole; DeWitt Ross & Stevens SC

(57) ABSTRACT

The present invention is directed to a cheese product having a blue cheese flavor and appearance a method of making the same. The method includes generating a coagulum comprising whey and curd from a pasteurized milk product, cutting and stirring the coagulum to release the whey from the curd, draining the whey from the curd, forming an emulsifier, adding the emulsifier to the curd, and pressing the curd into blocks. The emulsifier is preferably formed by blending oil and a paste and heating the oil and the paste. The paste preferably includes, among other ingredients, inert *Penicillium roqueforti*. A preferred version of the method further includes adding black pepper and ash to the curd. The resulting cheese product, unlike blue cheese, is elastic, does not crumble, and can be sliced and shredded.

22 Claims, No Drawings

BLUE CHEESE PRODUCT AND PROCESS FOR PREPARING SAME

FIELD OF THE INVENTION

The present invention is directed to a cheese product emulating blue cheese and a method of making the same.

BACKGROUND

There are inherent problems with the preparation of blue cheese. The problems relate to the body structure of the cheese, the length of time required to package and ship the cheese for sale, and contamination of plant and equipment by active blue cheese mold or spores.

Traditional blue cheese usually has a non-elastic quality about it. Thus, it tends to crumble into small pieces when attempting to slice it or shred it. In addition, it is difficult to melt traditional blue cheese for use in other dishes.

Traditional blue cheese typically requires a forty-five day "bloom" or ripening and maturation process due to active mold and spore development. This extended length of time delays packaging and shipping of the cheese for sale.

Further, the active molds and spores in traditional blue cheese typically "contaminate" cheese making plants and equipment, thereby rendering both the plants and the equipment unusable for making other forms of cheese.

SUMMARY OF THE INVENTION

The present invention is directed to the adaptation of a standard cheese, such as Monterey Jack cheese, to exhibit blue cheese characteristics.

One version of the invention is a method of making a cheese product. The method includes generating a coagulum comprising whey and curd from a pasteurized milk product, cutting and stirring the coagulum to release the whey from the curd, draining the whey from the curd, forming an emulsifier, adding the emulsifier to the curd, and pressing the curd into blocks. In a preferred version, the emulsifier includes inert *Penicillium roqueforti*.

The emulsifier is preferably formed by blending oil and a paste and heating the blended oil and paste. The oil is preferably a vegetable oil such as corn oil. The paste is preferably a flavoring paste that includes an ingredient selected from the group consisting of inert *Penicillium roqueforti*, cheese, blue cheese, water, lactic acid, sodium phosphate, butter oil, natural flavor, and enzyme. The oil is preferably blended and heated in an amount consisting of about $4.5 \times 10^{-6}$-$4.5 \times 10^{-4}$ gallons of oil per pound of the pasteurized milk product. The paste is preferably blended and heated in an amount of about 0.02-2% of paste by weight of the pasteurized milk product. The oil and paste are preferably blended in a proportion ranging about 1-500 pounds of paste per gallon of oil. The blend of oil and paste is preferably heated to a temperature of about 105° F.

A preferred version of the method further includes adding black pepper to the curd. The black pepper is preferably added in an amount ranging from about 0.002% to about 0.2% by weight of the pasteurized milk product.

A preferred version of the method also includes adding ash to the curd. The ash preferably added in an amount ranging from about 0.0005% to about 0.05% by weight of the pasteurized milk product.

The emulsifier, black pepper, and/or ash are preferably added to the curd when the curd is at a titratable acidity of about 23-28 g/L.

Another version of the invention includes a cheese product produced by a method as described above. The cheese product preferably has a physical property selected from the group consisting of a storage modulus that increases with increasing testing frequency, a loss modulus that is substantially consistent with increasing testing frequency, a phase angle that decreases with increasing testing frequency, and a softening point between about 38-56° C.

The cheese product of the present invention emulates the flavor of traditional blue cheese but uses a Monterey Jack cheese as its base, thus overcoming the aforementioned shortcomings associated with traditional blue cheese. From the Monterey Jack base, the emulsifier is added to give the cheese the desired flavor, texture, and appearance analogous to typical blue cheese. The black pepper, in part, enhances flavoring. The food-grade ash is added, in part, for color and consumer appeal.

The advantages of the cheese product of the present invention are many. Unlike traditional blue cheese, the body structure of the cheese product of the present invention has a more finished and elastic quality, i.e., it does not crumble, enabling the cheese product to be sliced and shredded. The cheese product also has significantly improved melt characteristics. These advantages increase customer appeal and provide new marketing opportunities and applications. For example, the blue cheese product of the present invention has application to salads, sandwiches, and burger toppings, as well as casseroles and baked dishes, soups, sauces, chilies, and stews, to name a few.

Inclusion of inert ingredients in the cheese product of the present invention also provides several advantages. The cheese product does not have to go through the additional time requirements for traditional blue cheese to "bloom" or ripen, which is typically takes forty-five or more days. This allows the cheese to be immediately shipped out after production and provides cost advantages to making the cheese. In addition, production of the cheese product does not suffer from "spore contamination" found in all conventional blue cheese production facilities. Therefore, the plant and equipment used to create the blue cheese product of the present invention can also be adapted for other forms of cheese. This creates production and plant flexibility, and permits production based on market demands and customer orders.

The product of the present invention has a unique "look" or "eye appeal" that resembles stone marble.

The objects and advantages of the invention will appear more fully from the following detailed description of the preferred embodiment of the invention made in conjunction with the accompanying drawings.

DETAILED DESCRIPTION OF THE INVENTION

In general terms, cheese is a concentrated food made from fluid cow's milk. In the process of making cheese, the casein protein component of the milk is induced to coagulate. The network structure formed therefrom entraps milkfat globules, but allows much of the water and soluble components (whey) to drain out. Typically, casein coagulation is induced by a combination of acid production by starter culture organisms and the action of the enzyme rennet. After coagulation, cheese undergoes a number of steps to separate the whey from the curd, followed by an aging step of variable length. The aging step allows characteristic flavor development due to microbial and enzyme activity.

The method of making the cheese product of the present invention includes a step of generating a coagulum comprising whey and curd from a pasteurized milk product. This step can be carried out by culturing a lactic acid-producing microorganism in a pasteurized milk product to produce lactic acid in the milk product, and adding a clotting enzyme to the cultured milk product to form a coagulum comprising whey and curd.

Preferred milk products include milk, nonfat milk, cream, and mixtures thereof. Methods of pasteurized milk products are well known the art and include those described herein.

The milk product is preferably cooled after pasteurization to a temperature of about 88° F. prior to adding and culturing the lactic acid-producing microorganism. The lactic acid-producing microorganism is preferably added as a started culture. The starter culture is preferably added in an amount of about 0.1-3% by weight of the milk product, more preferably in an amount of about 0.2-1.6% by weight of the milk product, and most preferably in an amount of about 0.4-0.8% of the milk product. The starter culture is preferably cultured in the pasteurized milk product for about 60 minutes.

Suitable lactic acid-producing microorganisms include naturally occurring microorganisms or genetically modified microorganisms. The lactic acid-producing microorganisms may include a combination of different lactic acid-producing microorganisms. Preferred lactic acid-producing microorganisms include lactic acid-producing bacteria selected from a group consisting of *Lactococcus, Streptococcus, Pediococcus, Enterococcus, Leuconostoc, Carnobacterium, Propionibacterium, Bifidobacterium* and *Lactobacillus* genuses and combinations thereof. The lactic acid-producing microorganism is preferably a thermophilic and/or mesophilic bacterium. An exemplary lactic acid-producing microorganism includes *Lactococcus lactis* ssp.

Suitable clotting enzymes include those derived from animals, plants, or microbes. The preferred clotting enzyme is rennet.

The method of making the cheese product of the present invention further includes a step of cutting and stirring the coagulum to release the whey from the curd. This step is preferably accompanied by warming the coagulum to a temperature from about 95° F. to about 110° F., preferably about 102° F., until the acid level of the coagulum reaches a titratable acidity of about 8-20 g/L, such as about 11-16 g/L.

The method of making the cheese product of the present invention also includes a step of draining the whey from the curd. This step is preferably performed when the coagulum reaches a titratable acidity of about 8-20 g/L, such as about 11-16 g/L. The whey may be partially or fully drained from the curd. In the preferred version of the invention, the whey is partially drained from the curd.

In addition to draining the whey from the curd, water may also be added to the curd. The water is preferably added when the coagulum is at a titratable acidity of about 8-20 g/L, such as about 11-16 g/L. The addition of water reduces the amount of lactose in the curd and lowers the level of titratable acidity to about 20-30 g/L, more preferably about 23-28 g/L, and cools the curd to a temperature of about 80-95° F., more preferably about 87° F.

The method of making the cheese product of the present invention further includes a step of forming an emulsifier. This step preferably includes blending oil and a paste. Suitable oils include any food-grade oil. In a preferred version, the oil is a vegetable oil such as corn oil. The oil may be blended in an amount consisting of about $4.5 \times 10^{-7}$-$4.5 \times 10^{-3}$ gallons per pound of the pasteurized milk, more preferably about $4.5 \times 10^{-6}$-$4.5 \times 10^{-4}$ gallons per pound of the pasteurized milk, even more preferably about $1.5 \times 10^{-5}$-$1.35 \times 10^{-4}$ gallons per pound of the pasteurized milk, and most preferably about $4.5 \times 10^{-5}$ gallons per pound of pasteurized milk.

The paste is, in part, a flavoring paste formulated to impart a blue cheese flavor to the cheese product of the present invention. In one version of the invention, the paste preferably includes an inert *Penicillium roqueforti*. "Inert" is used herein to mean that the *Penicillium roqueforti* is incapable of propagation. The inert *Penicillium roqueforti* may be generated by heat treating or encapsulating live *Penicillium roqueforti* to render it inert. Alternatively, or in addition, the paste of the present invention may include one or more ingredients selected from the group consisting of cheese, blue cheese, water, lactic acid, sodium phosphate, butter oil, natural flavor, and enzyme. The cheese ingredient in the paste is preferably not a blue cheese-type cheese and preferably includes ingredients selected from the group consisting of cultured cream, nonfat milk, reduced fat milk, salt, enzymes, and calcium chloride. The blue cheese ingredient in the paste preferably includes ingredients selected from the group consisting of pasteurized milk, cultures, salt, and enzymes. The butter oil ingredient in the paste is preferably derived from milk. The natural flavor preferably contains milk. An exemplary paste for use in the present invention includes "Ashe County Flavoring," produced by Cargill Flavoring Systems US, LLC (Waukesha, Wis.).

The paste may be blended in an amount consisting of about 0.002-20% by weight of the pasteurized milk product, preferably about 0.02-2% by weight of the pasteurized milk product, even more preferably about 0.07-0.6% by weight of the pasteurized milk product, and most preferably about 0.2% by weight of the pasteurized milk product.

The paste may be blended with the oil in a proportion including about 1-500 pounds paste per gallon oil, more preferably about 10-250 pounds paste per gallon oil, even more preferably about 25-100 pounds paste per gallon oil, and most preferably about 50 pounds paste per gallon oil.

The step of forming an emulsifier further includes the step of heating an oil and/or a paste, such as the blended oil and paste. The amounts of oil and paste that are heated include the amounts described above for the blending. The oil and/or the paste is preferably heated to a temperature of about 90-120° F., more preferably about 100-110° F., and most preferably about 105° F.

The method of making the cheese product of the present invention further includes a step of adding the emulsifier to the curd. The emulsifier is preferably added to the curd after the whey has been drained from the curd and/or the coagulum has reached an acid level of about 20-30 g/L, and preferably about 23-28 g/L.

The method of making the cheese product of the present invention also includes a step of pressing the curd into blocks. Such pressing may be achieved by pumping the curd into block-forming towers, where the cheese is pressed into blocks for approximately 20-30 minutes. Alternatively, the curd may be placed in muslin, sheeting cloth, or a cheese hoop and pressed.

A preferred version of the method of making the cheese product of the present invention also includes a step of adding black pepper to the curd. The black pepper is preferably added to the curd after the whey has been drained from the curd and/or the coagulum has reached an acid level of about 20-30 g/L, and preferably about 23-28 g/L. The black pepper is added in an amount of about 0.0002-2% by weight of the pasteurized milk product, preferably about 0.002-0.2% by weight of the pasteurized milk product, more preferably about 0.007-0.06% by weight of the pasteurized milk product, and most preferably about 0.02% by weight of the pasteurized milk product.

A preferred version of the method of making the cheese product of the present invention also includes a step of adding ash. The ash can be any food-grade ash and is preferably vegetable ash, such as grapevine ash. The ash is preferably added to the curd after the whey has been drained from the curd and/or the coagulum has reached an acid level of about 20-30 g/L, more preferably about 23-28 g/L. The ash is added in an amount of about 0.00015-0.15% by weight of the pasteurized milk product, preferably about 0.0005-0.05% by weight of the pasteurized milk product, more preferably about 0.0015-0.015% by weight of the pasteurized milk product, and most preferably about 0.005% by weight of the pasteurized milk product.

In a preferred version of the invention, the drained curd, black pepper, emulsifier, and/or ash are stirred until thoroughly mixed until they are evenly distributed.

One version of the cheese product of the present invention is a modified Monterey Jack cheese. Methods used in the production Monterey Jack cheese can be adapted for use in the present method. Monterey Jack cheese is typically made from pasteurized milk (i.e., held at a temperature of 61.6° C. for not less than 30 minutes or a time-temperature combination of equivalent lethality), since the cheese undergoes aging periods (generally less than 60 days). These aging periods are not sufficient enough to create conditions for pathogen growth. Pasteurization of cheesemilk destroys pathogenic bacteria and reduces the population of other micro-organisms present, thereby promoting starter culture growth. Once the pasteurized milk is prepared, starter culture is added to generate lactic acid from lactose, which, along with activity of added rennet, produces the casein coagulum. The coagulum is cut and then stirred and warmed to release the whey from the curd. At this point, the whey may be partially or fully drained and replaced with cold water to achieve a final mixed temperature of 26° C. (~80° F.). The cold water leaches the lactose from the curd. The objective of this washing step is to reduce the amount of lactose to a level that permits lactic acid development to produce a minimum pH of 5.0-5.2. Other cheeses without the washing step may reach lower final pH levels, due to the increased lactose available for the bacteria to convert to lactic acid. After washing, the whey/water is drained by piling curd at the sides of the vat or by pumping the curd to block-forming towers and finishing tables. The curd should not mat during this procedure. The curd is salted for flavor and preservative effects, pressed into blocks, and left to age. The pressure used for Monterey Jack during this pressing step is less than that used for Cheddar, making Monterey Jack cheese less firm. Monterey Jack is typically aged for 3 to 6 weeks.

One exemplary definition of "Monterey Jack" or "Monterey" cheese can be found in Title 21 of the Code of Federal Regulations, section 133, part 153 (21 CFR§133.153). As described therein, Monterey Jack cheese is the food prepared by the following procedure or by any other procedure which produces a finished cheese having the same physical and chemical properties. One or more dairy ingredients including milk, nonfat milk, and cream (as defined in 21 CFR§133.3), used alone or in combination, is subjected to the action of a lactic acid-producing bacterial culture. One or more clotting enzymes including rennet and/or other clotting enzymes of animal, plant, or microbial origin is added to set the dairy ingredients to a semisolid mass. The mass is so cut, stirred, and heated with continued stirring, as to promote and regulate the separation of whey and curd. Part of the whey is drained off, and water or salt brine may be added. The curd is drained and placed in a muslin or sheeting cloth, formed into a ball, and pressed; or the curd is placed in a cheese hoop and pressed. Later, the cloth bandage is removed, and the cheese may be covered with a suitable coating. One or more of other optional ingredients may be added during the procedure, which include: calcium chloride in an amount not more than 0.02% (calculated as anhydrous calcium chloride) by weight of the dairy ingredients, used as a coagulation aid; enzymes of animal, plant, or microbial origin, used in curing or flavor development; salt; antimycotic agents added to the surface of the cheese, the cumulative levels of which shall not exceed current good manufacturing practice; and vegetable oil, with or without rice flour sprinkled on the surface, used as a coating for the rind. The minimum milkfat content is 28-50 percent by weight of the solids, and the maximum moisture content is 44 percent by weight, as determined by the methods described in 21 CFR§133.5. The dairy ingredients used are pasteurized. The phenol equivalent of 0.25 grams of Monterey cheese is preferably not more than 3 micrograms, as determined by the method described in 21 CFR§133.5.

Preferred compositions of the cheese of the present invention include about 41% moisture, 24.5% protein, 30.3% fat, 1.0% carbohydrate, and 3.6% ash or +/−20% thereof, +/−10% thereof, +/−5% thereof, or +/−1% thereof. Preferred lipid profiles of the cheese of the present invention include (per 100 g cheese) 19.0 g saturated fatty acids, 8.8 g monounsaturated fatty acids, 0.9 g polyunsaturated fatty acids, and 0.089 g cholesterol or +/−20% thereof, +/−10% thereof, +/−5% thereof, or +/−1% thereof. Preferred vitamin and mineral contents of Monterey Jack cheese include (per 100 g cheese) 536 mg sodium, 81 mg potassium, 746 mg calcium, 444 mg phosphorus, 27 mg magnesium, 3.0 mg zinc, 0.72 mg iron, 0.032 mg copper, 0.011 mg manganese, 0.014 mg selenium, 0.208 mg vitamin A, 0.015 mg thiamin, 0.390 mg riboflavin, 0.093 mg niacin, 0.079 mg vitamin B6, 0.018 mg folate, 0.00083 mg vitamin B12, 0.210 pantothenic acid, 0 mg vitamin C, and 0.340 mg vitamin E or +/−20% thereof, +/−10% thereof, +/−5% thereof, or +/−1% thereof. It is preferred that the cheese of the present invention contains fewer than 100 *Escherichia coli* per gram and fewer than 100 *Staphylococcus aureus* per gram.

The cheese product of the present invention has specific physical characteristics, including elastic characteristics. The elastic characteristics can be characterized by the complex modulus (G*), storage modulus (G'), loss modulus (G"), and phase angle (δ). The complex modulus is the stress (force per unit area) amplitude divided by the strain (deformation per unit length) amplitude. The storage modulus (G') is the energy stored and released per oscillation, representing the elastic portion of the complex modulus. The loss modulus (G") is the energy lost per oscillation, representing the viscous portion of the complex modulus. The phase angle reflects the overall viscoelasticity of the cheese. It can be expressed as the loss tangent (tan δ=G"/G'). See, e.g., Brown et al., *J. Dairy Sci.* 2003, 86:3054-3067; and Foegeding et al., *J. Dairy Sci.* 2007, 90:1611-1624.

To obtain values for the above-mentioned elastic characteristics, dynamic oscillatory measurements are performed using a Bohlin VOR controlled-strain rheometer (Bohlin Reologi AB, Lund, Sweden) fitted with 30-mm diameter serrated parallel plates and an 11.085-g·cm torque bar. The use of the serrated plates prevents specimen slippage. Cheeses are sliced to a 2-mm thickness and placed onto the lower plate surface. The upper plate is then lowered to a 2-mm gap. The edges of the samples are cut to the dimensions of the plates, and a thin film of synthetic lubricant (Superlube, Loctite Corporation, Rocky Hill, Conn.) is applied to the exposed edges of the sample to minimize moisture loss. Samples are equilibrated to 25° C. before testing.

Values of complex modulus (G*), storage modulus (G'), loss modulus (G"), and phase angle (δ) are obtained under two conditions. First, strain sweeps are run on all samples to determine the linear viscoelastic region. Frequencies of 0.001, 0.01, 0.1, and 1.0 Hz are observed over a strain range of $1.5 \times 10^{-4}$ to $1.5 \times 10^{-1}$. These frequencies correspond to maximum strain rates of 0.047, 0.47, 4.7, and 47 $s^{-1}$, which allow for comparison to large strain data collected at similar rates (see large strain analysis). Second, frequency sweeps are performed on all samples to characterize changes in the viscoelastic behavior with time. Three frequency sweeps are completed on each treatment replication at a constant strain within the linear region from 0.001 to 20 Hz then returning to 0.001 Hz. Measurements of G*, G', G", and δ at 0.1 Hz are used for statistical analysis, as this frequency falls within a known range of chewing frequencies. See, e.g., Sharma et al., *J. Texture Stud.* 1973, 4:344-353.

The magnitude of the storage modulus (G') for the cheese product of the present invention is preferably higher for all samples than the magnitude of the loss modulus (G"), with G' increasing with increasing frequency. The increase in G' with increasing frequency is roughly linear, with values of about 3,000-10,000 Pa at a frequency of about 0.001 Hz, about 5,000-50,000 Pa at a frequency of about 0.1 Hz, and about 10,000-70,000 Pa at a frequency of about 10 Hz. The magnitude of loss modulus (G") is preferably about 1,000-7500 Pa at frequencies from about 0.001 Hz through 10 Hz. These trends are general characteristics of viscoelastic, weak gels. See, e.g., Kavanagh, et al, *Prog. Polym. Sci.*, 1998, 23:533-562. The magnitude of G' may change slightly with the age of the cheese product. However, a comparison of values determined at 0.1 Hz preferably shows no significant differences with the age of the cheese product.

Regarding phase angle (δ), a purely viscous material has a δ of 90°, and a purely elastic material has a δ of 0°. In the cheese products of the present invention, the pattern of response changes as frequency changes. At very low frequencies (0.001 Hz), δ is relatively high (i.e., about 20-35°), showing the dominant effect of the viscous component. This indicates that the cheeses behave more fluid-like when deformed at slower speeds. As the frequency of strain application increases (0.01 to 1.0 Hz), δ levels decrease (i.e., about 5-17.5°, showing that the speed has less of an influence on the relative effects of the viscoelastic properties. Finally, at very high frequencies, δ is low (i.e., about 2.5-10°), showing the dominant effect of the elastic component. This indicates that the cheeses behave more "solid-like" at such higher speeds.

The elastic properties of the cheese product of the present invention can also be characterized by torsional methods, which can be used to determine the nonlinear and fracture properties of the cheeses. Cylinders of cheese are formed using a 19-mm i.d. cork borer. The cylinders are cut to a length of 28.7 mm, and plastic disks (Gel Consultants, Raleigh, N.C.) are glued to the ends of the cylinder using cyanoacrylate glue (Loctite 100-Loctite Corporation) to enable the samples to be mounted to the grinding and twisting apparatuses. The cylinders are shaped into a capstan shape having a minimum diameter of 10-mm using a precision grinding machine (Gel Consultants, Raleigh, N.C.). Samples are twisted using a Haake 550 viscotester (Gebruder Haake GmbH, Karlsruhe, Germany) fitted with a fabricated apparatus that enable torsional measurement. See, e.g., Truong et al, *J. Food Sci.*, 2001, 66:716-721. The capstans are twisted at 0.045, 0.45, and 4.5 rpm, and three samples at each speed for each treatment replication are tested. These speeds correspond to strain rates of 0.0047, 0.047, and 0.47 $s^{-1}$ allowing for comparison with strain sweeps at similar strain rates.

True shear stress ($\sigma_t$) and true shear strain ($\gamma_{t-true}$) are calculated at each point from time at zero to time at fracture using the following relationships (Nadai, *J. Appl. Physics*, 1937, 8:205-213; Diehl et al, *J. Texture Stud.*, 1979, 10:371-400; Hammann, *AVI Publishing Company, Inc.*, 1983, Pages 351-383):

$$\sigma_t = \frac{2KM}{\pi r_{min}^3}$$

$$\gamma_t = \frac{2K\phi_s}{\pi r_{min}^3 Q}$$

$$\gamma_{t-true} = \ln\left[1 + \frac{\gamma_t^2}{2} + \gamma_t\left(1 + \frac{\gamma_t^2}{4}\right)^{1/2}\right],$$

where $r_{min}$ is the minimum capstan radius, K is the shape factor constant (equal to 1.08), M is the torque (N m), $\phi_s$ is the angular deformation of the curved section, and Q is the curvature section constant (equal to $8.45 \times 10^{-6}$ $m^{-3}$).

From these equations, the shear fracture modulus ($G_f$) is calculated according to the following equation (Bowland et al, *Food Hydrocoll*, 1995, 9:47-56):

$$G_f = \frac{\sigma_t}{\gamma_{t-true}}$$

where $\sigma_t$ is the true shear stress and $\gamma_{t-true}$ is the true shear strain.

The preferred fracture modulus ($G_f$) for the cheese product of the present invention increases as strain rate increases. Exemplary values include about 2500-12,500 Pa at a speed of about 0.08 rpm, about 12,500-17,500 Pa at a speed of about 0.8 rpm, and about 10,000-25,000 Pa at a speed of about 8 rpm. These characteristics indicate the viscoelastic, time-dependent nature of the cheeses.

Other physical characteristics of the cheese product of the present invention include melting characteristics. A typical cheese melt profile—the cheese height vs. time of flow curve—depicts the transition of cheese flow from a "flow initiation zone" to a "flow termination zone" via a "rapid flow zone," where most of the flow occurs. The cheese temperature as it transits from flow initiation to rapid flow zone is termed the softening point ($T_{sp}$). Cheese temperature vs. time is also normally plotted to facilitate graphical determination of $T_{sp}$ and end point, $T_{EP}$. The corresponding times $t_{sp}$ (softening time) and $t_{EP}$ (end time) and flow completion time ($t_{FC}$) and other parameters can also be computed as desired. The slope of the melt profile curve in the rapid flow zone is called the average flow rate, and can serve as a measure of cheese meltability. These parameters and methods for determining them are well known in the art. See, e.g., Gunasekaran et al., *Australian Journal of Dairy Technology*, 2002, 57(2):128-133. A preferred softening point for the cheese product of the present invention is preferably about 38-56° C. and more preferably about 40-52° C.

EXAMPLE

The present invention is directed to the adaptation of a standard cheese, such as Monterey Jack cheese, to exhibit blue cheese characteristics. The present invention begins with the creation of a base cheese product, such as Monterey Jack.

While other formulations can be used, a typical formulation for creating standard Monterey Jack cheese is as described below. All quantities, formulas, and procedures are based on a standard commercial cheese vat using 45,000 pounds of pasteurized milk heated to a minimum of 161° F. for a minimum of 16 seconds. The steps are as follows:

Milk is cooled to approximately 88° F. and a combination of starter cultures including mesophilic cultures and thermococcus adjunct cultures are added to produce lactic acid for approximately 60 minutes. Typically, 200-350 pounds of starter are used for the vat.

Vegetable rennet (approximately 42 oz) is added and allowed to set for approximately 20 minutes to produce the casein coagulum.

The coagulum is then cut and stirred and warmed to approximately 102° F. until the acid level of the coagulum reaches 11-16 g/L of titratable acidity. The whey is partially drained.

When the desired level of titratable acidity is achieved, water is added to cool the curd to approximately 87° F. to reduce the amount of lactose to desired levels and achieve the desired level of titratable acidity (23-28 g/L). Salt is typically added at this stage.

Normally at this stage, the Monterey Jack would be typically pumped to block-forming towers and finishing tables and the remainder of the whey would be removed. However, to create the blue cheese product of the present invention, the cheese production process is enhanced by the addition of black pepper, an emulsifier, and a powder, as described below.

When the coagulum reaches an acid level of 23-28 g/L of titratable acid, 10 lbs of food-grade black pepper is added and stirred in at the same time that routine salt is added. Stirring occurs until an even distribution of black pepper is achieved. The black pepper is used as a flavor enhancer.

An emulsion is formed using a blend of vegetable oil (preferably corn oil) and a unique refrigerated paste developed by Cargill Flavoring Systems US, LLC (Waukesha, Wis.). The paste is known as "Ashe County Flavoring." The Ashe County Flavoring provides the blue cheese flavoring using an inert variant of *Penicillium roqueforti*. The inoculum is encapsulated to cause it to be inert. Thus, the paste provides the blue cheese flavor but does not have live "mold" or active spores.

The emulsion is created by combining 2 gallons of vegetable oil and 100 pounds of the Ashe County Flavoring paste and heating the combined product to 105° F.

The resulting warmed blend is added to the cheese vat as an emulsifier to bring a blue cheese flavor to the cheese and, importantly, to consistently provide the finished product with the texture and eye appeal, i.e., the desired look, of the cheese.

The color ingredient is added. A natural food-grade vegetable ash (preferably grapevine ash) is added. The vat quantity of the ash powder is 2.2 pounds and is added by hand.

The resulting blend of finished Monterey Jack curd, black pepper, emulsifier, and ash are stirred until thoroughly mixed to an even distribution. This blend is then pumped to block-forming towers, where the cheese is pressed into blocks for approximately 20-30 minutes.

The blocks are then sealed and palletized.

Any version of any ingredient or method step of the invention may be used with any other ingredient or method step of the invention in any combination or subcombination whether explicitly described or not, unless otherwise specified or clearly implied to the contrary by the context in which the referenced combination is made.

All combinations of method steps as described herein can be performed in any order, unless otherwise specified or clearly implied to the contrary by the context in which the referenced combination is made.

As used herein, the singular forms "a," "an," and "the" include plural referents unless the content clearly dictates otherwise.

As used herein, "about" refers to +/−3% of the stated value.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references cited herein are expressly incorporated by reference to the same extent as if each individual reference were specifically and individually indicated as being incorporated by reference. In case of conflict between the present disclosure and the incorporated references, the present disclosure controls.

The methods, compounds, and compositions of the present invention can comprise, consist of, or consist essentially of the essential elements and limitations described herein, as well as any additional or optional steps, ingredients, components, or limitations described herein or otherwise useful in the art.

It is understood that the invention is not confined to the particular construction and arrangement of parts herein illustrated and described, but embraces such modified forms thereof as come within the scope of the following claims.

We claim:

1. A method of making a cheese product comprising:
   generating a coagulum comprising whey and curd from a pasteurized milk product;
   cutting and stifling the coagulum to release the whey from the curd;
   draining the whey from the curd;
   forming a warmed emulsifier that includes inert *Penicillium roqueforti* and an enzyme, wherein the forming the warmed emulsifier comprises heating a paste comprising the enzyme and the inert *Penicillium roqueforti* to a temperature of about 90-120° F.;
   adding the warmed emulsifier to the curd; and
   pressing the curd into blocks.

2. The method of claim 1 wherein the forming the warmed emulsifier includes heating oil.

3. The method of claim 2 wherein the heating the oil includes heating an amount of oil, wherein the amount of the oil is about $4.5 \times 10^{-6}$-$4.5 \times 10^{-4}$ gallons of oil per pound of amount of the pasteurized milk product used to generate the coagulum comprising the whey and the curd.

4. The method of claim 2 wherein the heating the oil includes heating an amount of oil, wherein the amount of the oil is about $4.5 \times 10^{-5}$ gallons of oil per pound of amount of the pasteurized milk product used to generate the coagulum comprising the whey and the curd.

5. The method of claim 1 wherein the heating the paste includes heating an amount of paste, wherein the amount of the paste is about 0.02-2% by weight of amount of the pasteurized milk product used to generate the coagulum comprising the whey and the curd.

6. The method of claim 1 wherein the heating the paste includes heating an amount of paste, wherein the amount of the paste is about 0.2% by weight of amount of the pasteurized milk product used to generate the coagulum comprising the whey and the curd.

7. The method of claim 1 wherein the paste further includes an ingredient selected from the group consisting of cheese, blue cheese, water, lactic acid, sodium phosphate, butter oil, and natural flavor.

8. A method of making a cheese product comprising:
generating a coagulum comprising whey and curd from a pasteurized milk product;
cutting and stifling the coagulum to release the whey from the curd;
draining the whey from the curd;
forming a warmed emulsifier, wherein the forming the emulsifier includes:
blending oil and a paste, wherein the paste includes an enzyme and inert *Penicillium roqueforti*; and
heating the blended oil and paste to a temperature of about 90-120° F.,
wherein the warmed emulsifier includes the inert *Penicillium roqueforti* and the enzyme;
adding the warmed emulsifier to the curd; and
pressing the curd into blocks.

9. The method of claim 8 wherein the blending the oil and paste includes blending an amount of oil with an amount of paste, wherein the amount of the oil is about $4.5\times10^{-6}$-$4.5\times10^{-4}$ gallons per pound of amount of the pasteurized milk product used to generate the coagulum comprising the whey and the curd, and wherein the amount of the paste is about 0.02-2% by weight of the amount of the pasteurized milk product used to generate the coagulum comprising the whey and the curd.

10. The method of claim 8 wherein the blending the oil and the paste includes blending a proportion of about 1-500 pounds of paste per gallon of oil.

11. The method of claim 8 wherein the blending the oil and the paste includes blending a proportion of about 50 pounds of paste per gallon of oil.

12. The method of claim 8 wherein the blended oil and paste are heated to about 105° F.

13. The method of claim 1 further comprising adding black pepper to the curd.

14. The method of claim 13 wherein the adding the black pepper to the curd includes adding an amount of black pepper, wherein the amount of the black pepper ranges from about 0.002% to about 0.2% by weight of amount of the pasteurized milk product used to generate the coagulum comprising the whey and the curd.

15. The method of claim 1 wherein the cutting and stifling the coagulum includes adjusting titratable acidity of the coagulum to about 11-16 g/L.

16. The method of claim 1 further comprising, prior to the adding the warmed emulsifier to the curd, adjusting titratable acidity of the coagulum to about 23-28 g/L.

17. The method of claim 1 further comprising adding an amount of ash to the curd, wherein the amount of the ash ranges from about 0.0005% to about 0.05% by weight of amount of the pasteurized milk product used to generate the coagulum comprising the whey and the curd.

18. A cheese product produced by the method of claim 1.

19. The cheese product of claim 18 wherein the product has a physical property selected from the group consisting of a storage modulus that increases with increasing testing frequency, a loss modulus that is substantially consistent with increasing testing frequency, a phase angle that decreases with increasing testing frequency, and a softening point between about 38-56° C.

20. The method of claim 1 wherein the forming the warmed emulsifier comprises heating the paste to a temperature of about 100-110° F.

21. The method of claim 1 wherein the forming the warmed emulsifier comprises heating the paste to a temperature of about 105° F.

22. The method of claim 8 wherein the forming the warmed emulsifier comprises heating the blended oil and paste to a temperature of about 100-110° F.

* * * * *

UNITED STATES PATENT AND TRADEMARK OFFICE
CERTIFICATE OF CORRECTION

| | |
|---|---|
| PATENT NO. | : 9,044,034 B2 |
| APPLICATION NO. | : 12/792895 |
| DATED | : June 2, 2015 |
| INVENTOR(S) | : Kenneth F. Heiman and Thomas S. Torkelson |

It is certified that error appears in the above-identified patent and that said Letters Patent is hereby corrected as shown below:

In Claim 1, line 4, "cutting and stifling..." should read "cutting and stirring..."

In Claim 8, line 4, "cutting and stifling..." should read "cutting and stirring..."

In Claim 15, line 1, "...cutting and stifling..." should read "...cutting and stirring..."

Signed and Sealed this
Twenty-third Day of February, 2016

Michelle K. Lee
*Director of the United States Patent and Trademark Office*